(12) United States Patent
Tarachandani et al.

(10) Patent No.: US 7,885,980 B2
(45) Date of Patent: *Feb. 8, 2011

(54) MECHANISM FOR IMPROVING PERFORMANCE ON XML OVER XML DATA USING PATH SUBSETTING

(75) Inventors: Asha Tarachandani, Newark, CA (US); Sivasankaran Chandrasekar, Palo Alto, CA (US); Nipun Agarwal, Santa Clara, CA (US); Eric Sedlar, San Francisco, CA (US); Ravi Murthy, Fremont, CA (US); Anh-Tuan Tran, Vacaville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 11/401,613

(22) Filed: Apr. 10, 2006

(65) Prior Publication Data

US 2006/0184551 A1 Aug. 17, 2006

Related U.S. Application Data

(63) Continuation-in-part of application No. 10/884,311, filed on Jul. 2, 2004, now Pat. No. 7,499,915.

(51) Int. Cl.
G06F 17/30 (2006.01)
(52) U.S. Cl. .................................................. 707/802
(58) Field of Classification Search ................. 707/1–3, 707/10, 101–102, 200, 802, 999.1; 712/136
See application file for complete search history.

(56) References Cited

U.S. PATENT DOCUMENTS 5,210,686 A   5/1993   Jernigan (Continued)

FOREIGN PATENT DOCUMENTS

EP        1 241 589 A2      9/2002

(Continued)

OTHER PUBLICATIONS

Bourret, R. et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

(Continued)

Primary Examiner—Don Wong
Assistant Examiner—Sheree N Brown
(74) Attorney, Agent, or Firm—Hickman Palermo Truong & Becker LLP

(57) ABSTRACT

Techniques are provided for indexing XML documents using path subsetting. According to one embodiment, a PATH table created for storing one row for each indexed node of the XML documents using user-defined criteria. The user-defined criteria are used to determine which nodes of XML documents to included in The PATH TABLE. The PATH table row for a node includes (1) information for locating the XML document that contains the node, (2) information that identifies the path of the node, and (3) information that identifies the position of the node within the hierarchical structure of the XML document that contains the node. Use of the user defined criteria is transparent to any query improves DML indexes overhead costs.

6 Claims, 2 Drawing Sheets

U.S. PATENT DOCUMENTS

| | | | |
|---|---|---|---|
| 5,295,261 A | 3/1994 | Simonetti |
| 5,369,763 A | 11/1994 | Biles |
| 5,404,513 A | 4/1995 | Powers et al. |
| 5,410,691 A | 4/1995 | Taylor |
| 5,454,101 A | 9/1995 | Mackay et al. |
| 5,467,471 A | 11/1995 | Bader |
| 5,524,240 A | 6/1996 | Barbara et al. |
| 5,530,849 A | 6/1996 | Hanushevksy et al. |
| 5,544,360 A | 8/1996 | Lewak et al. |
| 5,546,571 A | 8/1996 | Shan et al. |
| 5,568,640 A | 10/1996 | Nishiyama et al. |
| 5,643,633 A | 7/1997 | Telford et al. |
| 5,680,614 A | 10/1997 | Bakuya et al. |
| 5,701,467 A | 12/1997 | Freeston |
| 5,724,577 A | 3/1998 | Exley et al. |
| 5,734,887 A | 3/1998 | Kingberg et al. |
| 5,838,965 A | 11/1998 | Kavanagh et al. |
| 5,842,212 A | 11/1998 | Balluvio |
| 5,870,590 A | 2/1999 | Kita et al. |
| 5,878,415 A | 3/1999 | Olds |
| 5,917,492 A | 6/1999 | Bereiter et al. |
| 5,921,582 A | 7/1999 | Gusak |
| 5,964,407 A | 10/1999 | Sandkleiva |
| 5,974,407 A | 10/1999 | Sacks |
| 5,987,506 A | 11/1999 | Carter et al. |
| 6,003,040 A | 12/1999 | Mital et al. |
| 6,038,563 A | 3/2000 | Bapat et al. |
| 6,055,544 A | 4/2000 | DeRose et al. |
| 6,061,684 A | 5/2000 | Glasser et al. |
| 6,101,500 A | 8/2000 | Lau |
| 6,111,578 A | 8/2000 | Tesler |
| 6,112,209 A | 8/2000 | Gusack |
| 6,128,610 A | 10/2000 | Srinivasan et al. |
| 6,141,655 A | 10/2000 | Johnson et al. |
| 6,154,741 A | 11/2000 | Feldman |
| 6,182,121 B1 | 1/2001 | Wlaschin |
| 6,189,012 B1 | 2/2001 | Mital et al. |
| 6,192,273 B1 | 2/2001 | Igel et al. |
| 6,192,373 B1 | 2/2001 | Haegele |
| 6,199,195 B1 | 3/2001 | Goodwin et al. |
| 6,208,993 B1 | 3/2001 | Shadmon |
| 6,236,988 B1 | 5/2001 | Aldred |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,298,349 B1 | 10/2001 | Toyoshima et al. |
| 6,330,573 B1 | 12/2001 | Salisbury et al. |
| 6,343,287 B1 | 1/2002 | Kumar et al. |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,427,123 B1 | 7/2002 | Sedlar |
| 6,470,344 B1 | 10/2002 | Kothuri et al. |
| 6,487,546 B1 | 11/2002 | Witkowski |
| 6,496,842 B1 | 12/2002 | Lyness |
| 6,519,597 B1 * | 2/2003 | Cheng et al. ............ 707/10 |
| 6,539,398 B1 | 3/2003 | Hannan et al. |
| 6,549,916 B1 * | 4/2003 | Sedlar ............ 707/200 |
| 6,571,231 B2 | 5/2003 | Sedlar |
| 6,584,459 B1 * | 6/2003 | Chang et al. ............ 707/3 |
| 6,604,100 B1 | 8/2003 | Fernandez et al. |
| 6,609,121 B1 | 8/2003 | Ambrosini et al. |
| 6,636,845 B2 | 10/2003 | Chau et al. |
| 6,643,633 B2 | 11/2003 | Chau et al. |
| 6,662,342 B1 | 12/2003 | Marcy |
| 6,684,227 B2 | 1/2004 | Duxbury |
| 6,697,805 B1 | 2/2004 | Choquier et al. |
| 6,704,739 B2 | 3/2004 | Craft et al. |
| 6,704,747 B1 | 3/2004 | Fong |
| 6,708,186 B1 | 3/2004 | Claborn et al. |
| 6,718,322 B1 | 4/2004 | Brye |
| 6,725,212 B2 | 4/2004 | Couch et al. |
| 6,754,661 B1 | 6/2004 | Hallin et al. |
| 6,772,350 B1 | 8/2004 | Belani et al. |
| 6,785,673 B1 * | 8/2004 | Fernandez et al. ............ 1/1 |
| 6,801,224 B1 | 10/2004 | Lewallen |
| 6,826,553 B1 | 11/2004 | DaCosta et al. |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,920,457 B2 | 7/2005 | Pressmar |
| 6,964,025 B2 | 11/2005 | Angiulo et al. |
| 6,996,571 B2 | 2/2006 | McConnell |
| 7,013,425 B2 | 3/2006 | Kataoka |
| 7,031,956 B1 | 4/2006 | Lee et al. |
| 7,043,488 B1 | 5/2006 | Bauer et al. |
| 7,080,094 B2 | 7/2006 | Dapp et al. |
| 7,096,224 B2 | 8/2006 | Murthy et al. |
| 7,139,746 B2 * | 11/2006 | Shin et al. ............ 707/2 |
| 7,143,397 B2 | 11/2006 | Imaura |
| 7,162,485 B2 * | 1/2007 | Gottlob et al. ............ 707/102 |
| 7,171,404 B2 | 1/2007 | Lindblad et al. |
| 7,171,407 B2 | 1/2007 | Barton et al. |
| 7,216,127 B2 | 5/2007 | Auerbach |
| 7,287,023 B2 * | 10/2007 | Fan et al. ............ 707/3 |
| 7,315,852 B2 * | 1/2008 | Balmin et al. ............ 1/1 |
| 7,366,735 B2 | 4/2008 | Chandrasekaran et al. |
| 7,370,061 B2 * | 5/2008 | Chakraborty et al. ............ 707/102 |
| 7,499,915 B2 | 3/2009 | Chandrasekar et al. |
| 7,685,145 B2 | 3/2010 | Bruno et al. |
| 2001/0049675 A1 | 12/2001 | Mandler et al. |
| 2002/0056025 A1 | 5/2002 | Chaoxin et al. |
| 2002/0073019 A1 | 6/2002 | Deaton |
| 2002/0078068 A1 | 6/2002 | Krishnaprasad et al. |
| 2002/0116371 A1 | 8/2002 | Dodds et al. |
| 2002/0116457 A1 | 8/2002 | Eshleman et al. |
| 2002/0133484 A1 | 9/2002 | Hoang et al. |
| 2002/0143512 A1 | 10/2002 | Shamoto et al. |
| 2002/0152267 A1 | 10/2002 | Lennon |
| 2002/0156811 A1 | 10/2002 | Krupa |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2003/0004937 A1 | 1/2003 | Salmenkaita et al. |
| 2003/0009361 A1 | 1/2003 | Hancock et al. |
| 2003/0065659 A1 | 4/2003 | Agarwal et al. |
| 2003/0078906 A1 | 4/2003 | Ten-Hove et al. |
| 2003/0093672 A1 | 5/2003 | Cichowlas |
| 2003/0101194 A1 | 5/2003 | Rys et al. |
| 2003/0131051 A1 | 7/2003 | Lection et al. |
| 2003/0140311 A1 | 7/2003 | Lemon et al. |
| 2003/0167456 A1 | 9/2003 | Sabharwal |
| 2003/0172135 A1 | 9/2003 | Bobick et al. |
| 2003/0177341 A1 | 9/2003 | Devillers |
| 2003/0182624 A1 | 9/2003 | Large |
| 2003/0212662 A1 | 11/2003 | Shin et al. |
| 2003/0212664 A1 * | 11/2003 | Breining et al. ............ 707/3 |
| 2004/0010752 A1 | 1/2004 | Chan et al. |
| 2004/0043758 A1 | 3/2004 | Sorvari et al. |
| 2004/0044659 A1 * | 3/2004 | Judd et al. ............ 707/3 |
| 2004/0064466 A1 | 4/2004 | Manikutty et al. |
| 2004/0068494 A1 | 4/2004 | Tozawa et al. |
| 2004/0088320 A1 | 5/2004 | Perry |
| 2004/0103105 A1 | 5/2004 | Lindblad et al. |
| 2004/0148278 A1 | 7/2004 | Milo et al. |
| 2004/0149278 A1 * | 8/2004 | Lin ............ 126/299 R |
| 2004/0167864 A1 | 8/2004 | Wang et al. |
| 2004/0176958 A1 | 9/2004 | Salmenkaita et al. |
| 2004/0205551 A1 | 10/2004 | Santos |
| 2004/0220912 A1 | 11/2004 | Manikutty et al. |
| 2004/0225680 A1 | 11/2004 | Cameron et al. |
| 2004/0230667 A1 | 11/2004 | Wookey |
| 2004/0267760 A1 * | 12/2004 | Brundage et al. ............ 707/100 |

| | | | |
|---|---|---|---|
| 2005/0033733 A1 | 2/2005 | Shadmon et al. | |
| 2005/0038688 A1 | 2/2005 | Collins et al. | |
| 2005/0050016 A1 | 3/2005 | Stanoi et al. | |
| 2005/0050058 A1 | 3/2005 | Jain et al. | |
| 2005/0050092 A1 | 3/2005 | Jain et al. | |
| 2005/0091188 A1* | 4/2005 | Pal et al. | 707/1 |
| 2005/0097084 A1* | 5/2005 | Balmin et al. | 707/3 |
| 2005/0108630 A1 | 5/2005 | Wasson et al. | |
| 2005/0120031 A1 | 6/2005 | Ishii | |
| 2005/0187897 A1* | 8/2005 | Pawar et al. | 707/1 |
| 2005/0228792 A1 | 10/2005 | Chandrasekaran et al. | |
| 2005/0228818 A1 | 10/2005 | Murthy et al. | |
| 2005/0229158 A1 | 10/2005 | Thusoo et al. | |
| 2005/0257201 A1* | 11/2005 | Rose et al. | 717/136 |
| 2005/0278616 A1 | 12/2005 | Eller | |
| 2005/0289125 A1 | 12/2005 | Liu et al. | |
| 2006/0080345 A1 | 4/2006 | Murthy et al. | 707/100 |
| 2006/0129584 A1 | 6/2006 | Hoang et al. | |
| 2006/0195476 A1 | 8/2006 | Nori et al. | |
| 2007/0239681 A1 | 10/2007 | Krishnaprasad et al. | |
| 2007/0250527 A1 | 10/2007 | Murthy et al. | |
| 2008/0098001 A1 | 4/2008 | Gupta et al. | |
| 2008/0098019 A1 | 4/2008 | Sthanikam et al. | |
| 2008/0098020 A1 | 4/2008 | Gupta et al. | |

FOREIGN PATENT DOCUMENTS

| | | |
|---|---|---|
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

Braga, Daniele et al., "A Graphical Environment to Query XML Data with Query," Proc. Fourth International Conference on Web Information Systems Engineering (WISE '03), 2003, IEEE, 10 pages.
Chae, Mi-Ok et al., "Design and Implementation of an Object-Oriented Multimedia DBMS Tightly Couple with Information Retrieval Functions," Proc. Seventeenth IASTED International Conference on Applied Informatics, Feb. 15-18, 1999, abstract.
Chakraborty, Krishnendu, "The XML Garbage Collector," The Source for Developers, Sun Developer Network Site XP-002297849, Mar. 2002.
Cheng, Josephine et al., "IBM DB2 XML Extender," IEEE, ICDE '00 Conference, San Diego, Feb. 2000, 128 pages. (Reference on enclosed CD-ROM).
Cooper, Brian F. et al., "A Fast Index for Semistructured Data," Proc. of the International Conference on Very Large Databases, 2001, XP-002303292, pp. 341-350.
Diao, Y. et al., "Path Sharing and Predicate Evaluation for High Performance XML Filtering," XP-002344354 ACM Transactions on Database Systems (2003), pp. 467-516.
Diao, Y. et al., "YFilter: Efficient and Scalable Filtering of XML Documents," IEEE (2002), 2 pages.
Draper, Denise, "Mapping Between XML and Relational Data" [online], Feb. 6, 2004 [retrieved on Aug. 17, 2004]. Retrieved from the Internet: http://www.awprofessional.com/articles/printerfriendly.asp?p-169590 (Reference on enclosed CD-ROM).
Helmer, S. et al., "Optimized Translations of XPath into Algebraic Expressions Parameterized by Programs Containing Navigational Primitives" IEEE (2002) 10 pages.
Jonah, Kevin, Databases Tag Along with XML [online], Jul. 1, 2002, [retrieved on Aug. 17, 2004]. Retrieved from the Internet: http://www.gcn.com/21_17/guide/19148-1.html 3 pages.
Kudrass, Thomas, "Management of XML Documents Without Schema in Relational Database Systems," Information and Software Technology, vol. 44, No. 4, Mar. 31, 2002, XP-004347776, pp. 269-275.
Lehman, Mike, "From XML to Storage and Back" [online], [retrieved on Aug. 17, 2004]. Retrieved from the Internet: http://www.oracle.com/technology/oramag/oracle/03-mar/o23xml.html 8 pages.
Lo et al., "XAS: A System for Accessing Componentized, Virtual XML Documents," IEEE, 2001, pp. 493-502.
McHugh, Jason et al., "Query Optimization for XML," XP-002333353, Proc. of the 25$^{th}$ VLDB Conference (1999) pp. 315-326.
McHugh, Jason et al., "Indexing Semistructured Data," Stanford Science Department, 1998, XP-002248313, pp. 1-21.
Manolescu, Dragos, Review of "Metadata solutions: using metamodels, repositories, XML, and enterprise portals to generate information on demand by Adrienne Tannenbaum," Mar. 2003, ACM Press, vol. 28, Issue 2, p. 38.
Michell, Nancy, "Data Shredding, Updating the Status Bar, and More," [online], Feb. 2003, [retrieved on Aug. 17, 2004]. Retrieved from the Internet: http://msdn.microsoft.com/msdnmag/issues/03/03/WebQA/ 6 pages.
Myllymaki, Jussi, "Effective Web Data Extraction with Standard XML Technologies," WWW10, May 1-5, 2001, pp. 689-696.
Noser, Hansrudi et al., "Dynamic 3D Visualization of Database-Defined Tree Structures on the WWW by Using Rewriting Systems," 2000, IEEE, XP-002262516, pp. 247-254.
Peng, Feng et al., "XPath queries on streaming data" (2003) ACM Press, pp. 431-442.
Schmidt, et al., "Why and How to Benchmark XML Databases," SIGMOND Record, vol. 3, No. 3, Sep. 2001, pp. 27-32.
Vion-Dury, Jean-Yves, "XPath on left and right sides of rules: toward compact XML tree rewriting through node patterns," (2003) ACM Press, pp. 19-25.
Vorthman, S. et al., "Beyond Schemas, Schema Adjuncts and the Outside World," Markup Languages, Online!, vol. 2, No. 3, Jun. 2000, pp. 1-8.
W3C, "XML Fragment Interchange," W3C Working Draft, Jun. 30, 1999, XP-002167090, 17 pages.
W3C, "XML Fragment Interchange," W3C Candidate Recommendation, Feb. 12, 2001, pp. 1-16.
W3C, XML Path Language (XPath) Version 1.0, W3C Recommendation Nov. 16, 1999 [online] Copyright 1999 [retrieved on Aug. 16, 2004]. Retrieved from the Internet: http://www.w3.org/TR/xpath (Reference on enclosed CD-ROM).
Yoshikawa, Masatoshi et al., "XRel: A Path-Based Approach to Storage and Retrieval of XML Documents Using Relational Databases," XP-001143686, ACM Transactions on Internet Technology (2001), pp. 110-141.
Zhang, Wansong, et al., "An Encoding Scheme for Indexing XML Data," E-Commerce and E-Service, 2004, XP-010697639, pp. 526-529.
Zisman et al., "Using XML to Build Consistency Rules for Distributed Specifications," Proc. of the Tenth International Workshop on Software Specification and Design (IWSD'00), IEEE 2000, 8 pages.
"Communication Pursuant to Article 96(2) EPC," EP App. No. 02799692.5, dated Jan. 18, 2006, 5 pages.
"Notification of Transmittal of the International Search Report and Written Opinion of the International Searching Authority, or the Declaration," Application No. PCT/US2005/011763, dated Aug. 1, 2005, 12 pages.
"Notification of Transmittal of the International Search Report and Written Opinion of the International Searching Authority, or the Declaration," Application No. PCT/US2005/020795, dated Sep. 27, 2005, 13 pages.
"Written Opinion of the International Preliminary Examining Authority," International Preliminary Examining Authority, Application No. PCT/US2005/020795, dated May 31, 2006, 5 pages.
"Notification of Transmittal of the International Preliminary Report of Patentability," International Preliminary Examining Authority, Application No. PCT/US2005/020795, dated Aug. 7, 2006, 10 pages.
MacKenzie, David et al., "Finding Files", GNU Findutils Version 4.1.2, Nov. 1994, 38 pages.
Bayardo et al., "Optimizing encoding: An evaluation of binary xml encoding optimizations for fast stream based xml processing", May 2004, Proceedings of the 13th international conference on World Wide Web WWW 04', Publisher ACM press, 7 pages.
Liu et al., "XML retrieval: Configurable indexing and ranking for XML information retrieval", Jul. 2004, Proceedings of the 27th annual international ACM SIGIR conference on Research and development in information retrieval SIGIR 04', Pulished by ACM press, 12 pages.

Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.

Min et al., "XML Indexing and compression: XPRESS: a queriable compression for XML data", Jun. 2003, Proceedings of the 2003 ACM SIGMOD international conference on Management of data SIGMOD 03', Published by ACM Press, 8 pages.

Zou et al., "XML Processing: Ctree: a compact tree for indexing XML data" Nov. 2004, Proceedings of the 6th annual international workshop on Web information and data management WIDM 04', Published by ACM Press, 10 pages.

Girardot et al., "Millau: an encoding format for efficient representation and exchange of XML over the Web", IBM Almaden Research Center, 24 pages.

Shankar Pal et al., "Indexing XML Data Stored in a Relational Database", Proceedings of the 30$^{th}$ VLDB Conference, 2004, 12 pages.

MacKenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2nd Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

M. Stonebraker, "The Case for Partial Indexes", 1989, 8 pages.

U.S. Appl. No. 11/442,106, filed May 25, 2006, Advisory Action, Mailing Date Jul. 15, 2009.

U.S. Appl. No. 11/407,663, filed Jul. 31, 2009, Final Office Action, Mailing Date Jul. 31, 2009.

U.S. Appl. No. 11/059,665, filed Feb. 15, 2005, Notice of Allowance, Mailing Date Sep. 24, 2008.

Daniel C. Zilio et al., "DB2 Advisory: An Optimizer Smart Enough to Recommend Its Own Indexes", 2000 IEEE, pp. 101-110.

\* cited by examiner

US 7,885,980 B2

MECHANISM FOR IMPROVING PERFORMANCE ON XML OVER XML DATA USING PATH SUBSETTING

RELATED APPLICATION

This application is a continuation-in-part of and claims priority to U.S. patent application Ser. No. 10/884,311, entitled Index For Accessing XML Data, filed on Jul. 2, 2004 now U.S. Pat. No. 7,499,915 by Sivasankaran Chandrasekar, the contents of which are herein incorporated by reference in their entirety for all purposes.

This application is related to U.S. patent application Ser. No. 11/442,106, filed on May 25, 2006 entitled Isolation for Applications Working on Shared XML Data, filed by Asha Tarachandani, the entire contents of which are herein incorporated by reference in their entirety for all purposes.

FIELD OF THE INVENTION

The present invention relates to indexing XML data, and in particular, using path subsetting to more efficiently index XML data.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many database systems allow storage and querying of XML data. Though there are many evolving standards for querying XML, many of them include some variation of XPath. However, database systems are usually not optimized to handle XPath queries, and the query performance of the database systems leaves much to be desired. For example, a database system may satisfy an XPath query by performing a full scan of all documents. while a full scan of all documents can be used to satisfy all XPath queries, the implementation would be very slow due to the lack of indexes.

One solution to efficiently satisfy XPath queries involves providing indexes built over data stored as XML data (referred to herein as an "XML indexes"). Indexing information about XML documents allows for more efficient evaluating of Xpath expressions, by knowing how to specifically identify and locate elements in XML documents.

When the user submits a query involving XPaths (as predicate or fragment identifier), the user XPath is decomposed into a SQL query that accesses the XML index. Then the generated query typically performs a set of lookups using the XML index and merges their results appropriately.

As XML indexes are widely used in database systems for improving query prefomance the maintenance and overhead associated with the XML indexes is becoming increasing costly. Thus, there is always a trade-off between the index-maintenance overhead and the value added by the index. Therefore, there is a need to reduce the XML index maintenance overhead in order to effectively improve query performance.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
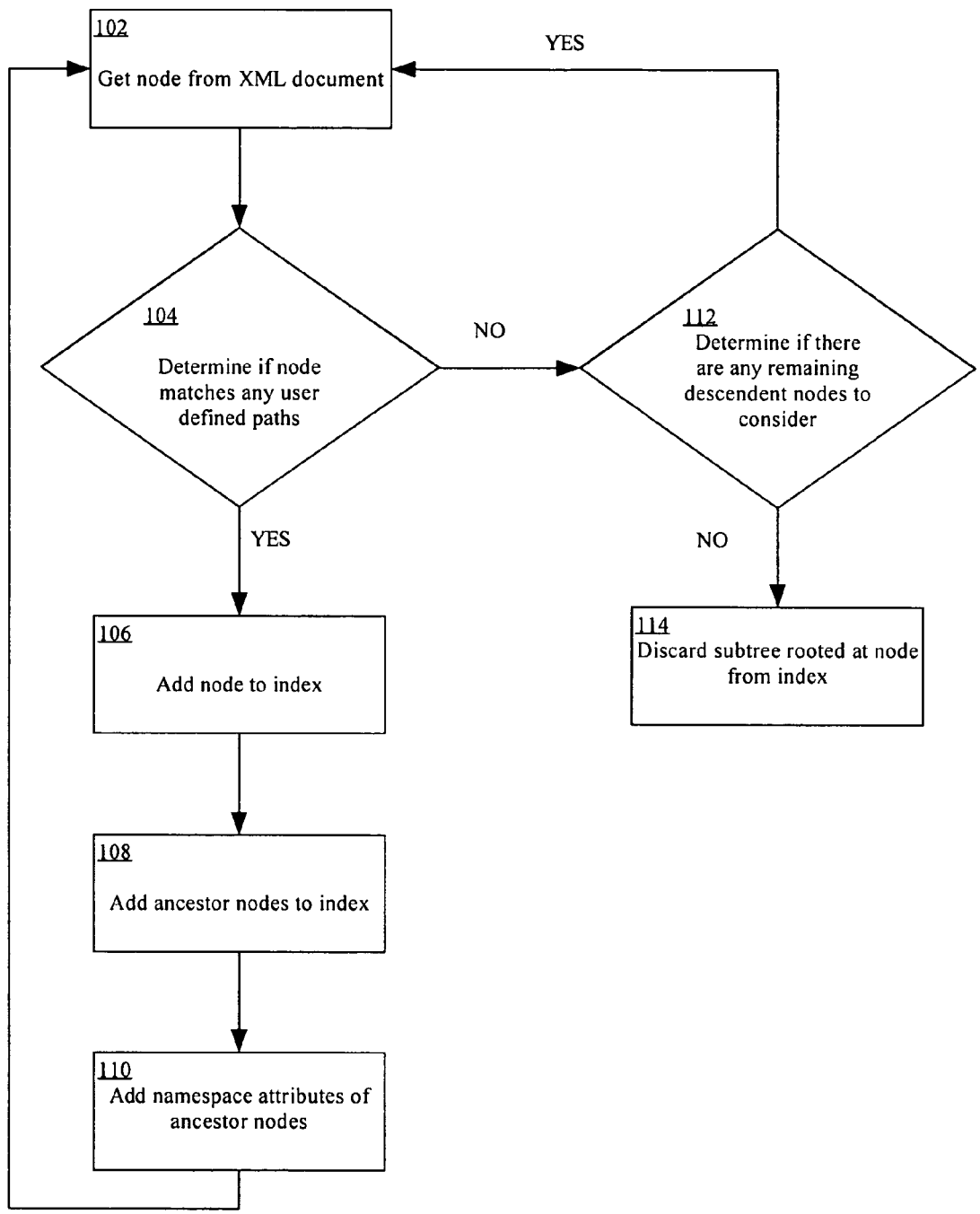
FIG. 1 is a flowchart illustrating steps for determining whether a node is to be included in an XML index based on user specified path subsets.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Functional Overview

A mechanism is provided for improving performance of storing and accessing XML documents by indexing only a subset of nodes in a collection of XML documents. A subset of nodes designated to be indexed or designated not to be indexed by a set of rules (e.g. path expressions) is referred herein to as a path subset. Path subsetting involves defining path subsets and indexing XML documents accordingly. Path subsetting may be used regardless of the format and data structures used to store the actual XML data (the "base structures"). For example, the actual XML data can reside in structures within or outside of a database managed by a DBMS (Database Management System), in any form, such as CLOB (character LOB storing the actual XML text), O-R (object-relational structured according to a schema, such as an XML schema), or BLOB (binary LOB storing some binary form of the XML).

The techniques described herein involve using a set of structures, which collectively constitute an index, for accessing XML data. In one embodiment, a mechanism is provided by which a user may specify rules that determine which subset of node in an XML document are to be indexed. Specifically, a user may register rules that expressly include certain XML paths, and/or rules that expressly exclude certain XML paths.

In one embodiment, the XML index that contains a user specified subset of nodes, results in one or more of the following benefits: (1) Improved search performance of XPath-based queries. (2) Allowing customizations of the values stored in the index. (3) the user specified nodes is transparent to any query. (4) Improved overhead costs associated with maintaining the index.

Hierarchy Nature of XML Data

XML documents are represented as hierarchy of nodes that reflects the XML documents hierarchical nature. The structure of an XML document establishes parent-child relationships between the nodes within the XML document. A hierarchy of nodes is composed of nodes at multiple levels. Each node at a level below the top level is a child node of one or more of the parent nodes at the level above. Nodes at the same level are siblings. A node that has no parent node linked to it is the root node, and a node that has no child nodes linked to it is a leaf node. The "path" for a node in an XML document reflects the series of parent-child links, starting from a "root" node, to arrive at the particular node.

For the purpose of explanation, consider the following XML document:

---
Po1.xml

```
<PurchaseOrder>
    <Reference>ABEL-20021127121040897PST</Reference>
    <Actions>
        <Action>
            <User>ZLOTKEY</User>
        </Action>
        <Action>
            <User>KING</User>
        </Action>
    </Actions>
    ...
</PurchaseOrder>
```
---

The path to the "User" node in po1.xml is /PurchaseOrder/Actions/Action/User, since the "User" node is a child of the "Action" node, the "Action" node is a child of the "Actions" node, and the "Actions" node is a child of the "PurchaseOrder" node. PurchaseOrder is the root node.

An XML index may be built on all of the paths within all of the indexed XML documents, or a subset of the paths within the indexed XML documents. Techniques for specifying which paths are index are described hereafter. The set of paths that are indexed by a particular XML index are referred to herein as the "indexed XML paths".

The XML Index

According to one embodiment, an XML index is a domain index that improves the performance of queries that include Xpath-based predicates and/or Xpath-based fragment extraction. An XML index can be built, for example, over both XML Schema-based as well as schema-less XMLType columns which are stored either as CLOB or structured storage. In one embodiment, an XML index is a logical index that results from the cooperative use of a path index, a value index, and an order index.

The path index provides the mechanism to lookup fragments based on simple (navigational) path expressions. The value index provides the lookup based on value equality or range. There could be multiple secondary value indexes—one per datatype. The order index associates hierarchical ordering information with indexed nodes. The order index is used to determine parent-child, ancestor-descendant and sibling relationships between XML nodes.

The Path Table

According to one embodiment, a logical XML index includes a PATH table, and a set of secondary indexes. As mentioned above, each indexed XML document may include many indexed nodes. The PATH table contains one row per indexed node. For each indexed node, the PATH table row for the node contains various pieces of information associated with the node.

According to one embodiment, the information contained in the PATH table includes (1) a PATHID that indicates the path to the node, (2) "location data" for locating the fragment data for the node within the base structures, and (3) "hierarchy data" that indicates the position of the node within the structural hierarchy of the XML document that contains the node. Optionally, the PATH table may also contain value information for those nodes that are associated with values.

User Selection of which Paths to Index

According to one embodiment, a mechanism is provided by which a user may specify rules that determine which nodes in XML documents are to be indexed by an XML index. Specifically, a user may register rules that expressly include certain XML paths, and/or rules that expressly exclude certain XML paths.

According to one embodiment, the user can explicitly specify the set of nodes (subtrees) to be indexed—thereby omitting the remaining nodes from the PATH table. This is typically used to exclude fragments which are known to be useless from a query standpoint. By reducing the number of indexed nodes, the space usage and management efficiency of the XML index can be improved.

According to one embodiment, an initial registration of rules may occur at the time the XML index is created. In another embodiment of this invention, the user can provide registration of rules in the form of a list after the creation of the index. The user specifies the subset of nodes in XML documents to be index by providing a subset of XPaths. For purpose of illustration consider the following XML document:

---
Po2.xml

```
<PurchaseOrder>
    <Reference>SBELL-2002100912333601PDT</Reference>
    <Actions>
        <Action>
            <User>SVOLLMAN</User>
        </Action>
    </Actions>
    ...
</PurchaseOrder>
```
---

Assume that the documents that are to be indexed are stored in a purchase Order table. If the user wants to index all the Lineitem elements and their children, and the purchase order reference number and requestor, then the following Create Index DDL ("data definition language") statements can be issued to a DBMS:

---
```
CREATE INDEX POIndex1 ON purchaseOrder
    INDEXTYPE IS XML INDEX
    PARAMETERS 'PATHS   (/PurchaseOrder/LineItems//*,
                         /PurchaseOrder/Reference)
                PATH TABLE POIndex_path_table'
```
---

In this example, the POIndex_path_table denotes the name of the table used by the domain index to store the index data. In the preceding example, the rules expressly include certain paths. All paths not expressly included by the rules will be excluded from the index.

If the XML document uses namespaces, then the index can be created with specified namespaced. For example, the Reference node belonged to a different namespace. The index can be created by:

---
```
CREATE INDEX POIndex1 ON purchaseOrder
    INDEXTYPE IS XML INDEX
    PARAMETERS 'PATHS (/PurchaseOrder/LineItems//*,
                       /PurchaseOrder/ipo:Reference NAMESPACE
                       MAPPINGS
```

```
(xmlns:ipo = "http://www.example.com/IPO")
                    PATH TABLE POIndex_path_table'
```

A user may also specify rules that expressly exclude paths. For example, to index all the paths of the documents except the Lineitem descriptions and the purchaseOrder actions, the following Create Index DDL is used to create the index:

```
CREATE INDEX POIndex2 ON purchaseOrder
INDEXTYPE IS XML INDEX PARAMETERS 'PATHS EXCLUDE
    /PurchaseOrder/LineItems/LineItem/Description,
    /PurchaseOrder/Actions)
    PATH TABLE POIndex_path_table2'
```

When an XML document is being indexed, each node in the XML document is matched against the user specified XPaths. If the node does not match any of the user specified paths, and no descendants of the node can match the any of the user specified paths, then the entire subtree rooted at the node is omitted from the index.

On the other hand, if the node matches any of the user specified paths, then one or more of the following will occur: (1) the fragment rooted at the node is added to the index. (2) All of the node's ancestors nodes are added to the index. (3) any namespace attributes within the ancestor element nodes are also added to the index. The addition of ancestors and namespace-mapping ensures that the index can be successfully used to construct node fragments of indexed nodes during a query.

FIG. 1 illustrates the steps for determining which nodes of an XML document to index. In step 102 a node is retrieved from an XML document that is being indexed. In step 104 the node is compared to the user defined path subsets. If the node matches any of the path subsets then in step 106 the node is added to the index. In step 108 the ancestors of the node are also added to the index. The ancestors of the node include all nodes along the path that lead to matched node. In step 110 any namespace attributes within the ancestor nodes are also added to the index.

If in step 104 it is determined that the node does not match any of the defined path subsets, then in step 112 a determination is made to establish whether there are any descendant nodes of the node that remain to be considered for indexing. If there are no descendant nodes remaining to be considered for indexing or none of the descendant nodes produced a match with any of the path subsets, then in step 114, the XML subtree rooted at the node is discarded from the indexes. However, if there are any remaining descendant nodes that produced a match with the path subsets or there are descendant nodes that still need to be compared to the path subsetting rules then the node and its subtree will not yet be discarded from the index. In this case, the next node from the XML document will be retrieved and the process repeats until all nodes have been considered for indexing.

Use of Wildcarding to Determine which Paths to Index

According to one embodiment, the user can include a wildecard symbol in the Xpath. The rule /PurchaseOrder/LineItems//* includes a wildcard symbol "*". Consequently, the rule expressly includes the path/PurchaseOrder/LineItems and the path to all nodes that descend from the path/PurchaseOrder/LineItems. This is merely one example of how wildcards may be used in the rules. According to one embodiment, the path selection rule mechanism supports wildcards in any number of contexts. For example, the rule /nodex/*/nodey/nodez selects all paths that (1) descend from /nodex/ and (2) terminate in /nodey/nodez, regardless of the path between nodex and nodey/nodez.

Query Support in the Presence of Path-Subsetting

With the introduction of path-subsetting in the index, determining at query compilation time whether or not an index can be used to satisfy a query becomes more complicated. A determination by a DBMS of whether an index can be used not only depends on the base table to be accessed but also on whether the index may be used to find nodes within paths specified by the query.

In order to make this determination, at query compilation time, the XPath expressions within the query are checked against the one or more criteria used to create the index to determine whether evaluation of the XPath expression can be satisfied by the path subsets contained in the index. The one or more criteria may be described by metadata ("index metadata") that defines the index. The index metadata is maintained by the DBMS and may be modified to describe the one or more criteria when, for example, the user registers path subsets by issuing DDL statements, such as those described earlier.

In the situation where one or more criteria used to created the index specifies a subset of paths to include in the index, the DBMS determines whether a given XPath expression is within a path subset covered by the index. In the situation where the one or more criteria used to create the index specifies a path subsets to exclude from the index, the DBMS determines whether the given XPath expression is not a subset of any of the excluded paths. This check determines whether an index can be used to satisfy an XPath query. The process of deciding to not use or use an index and/or using the index may be performed automatically and transparently, that is the process is performed, without users, applications, and even other software layers within the DBMS but outside of the query compilation layer, being aware of the process or being notified of it.

Hardware Overview

Figure 2:
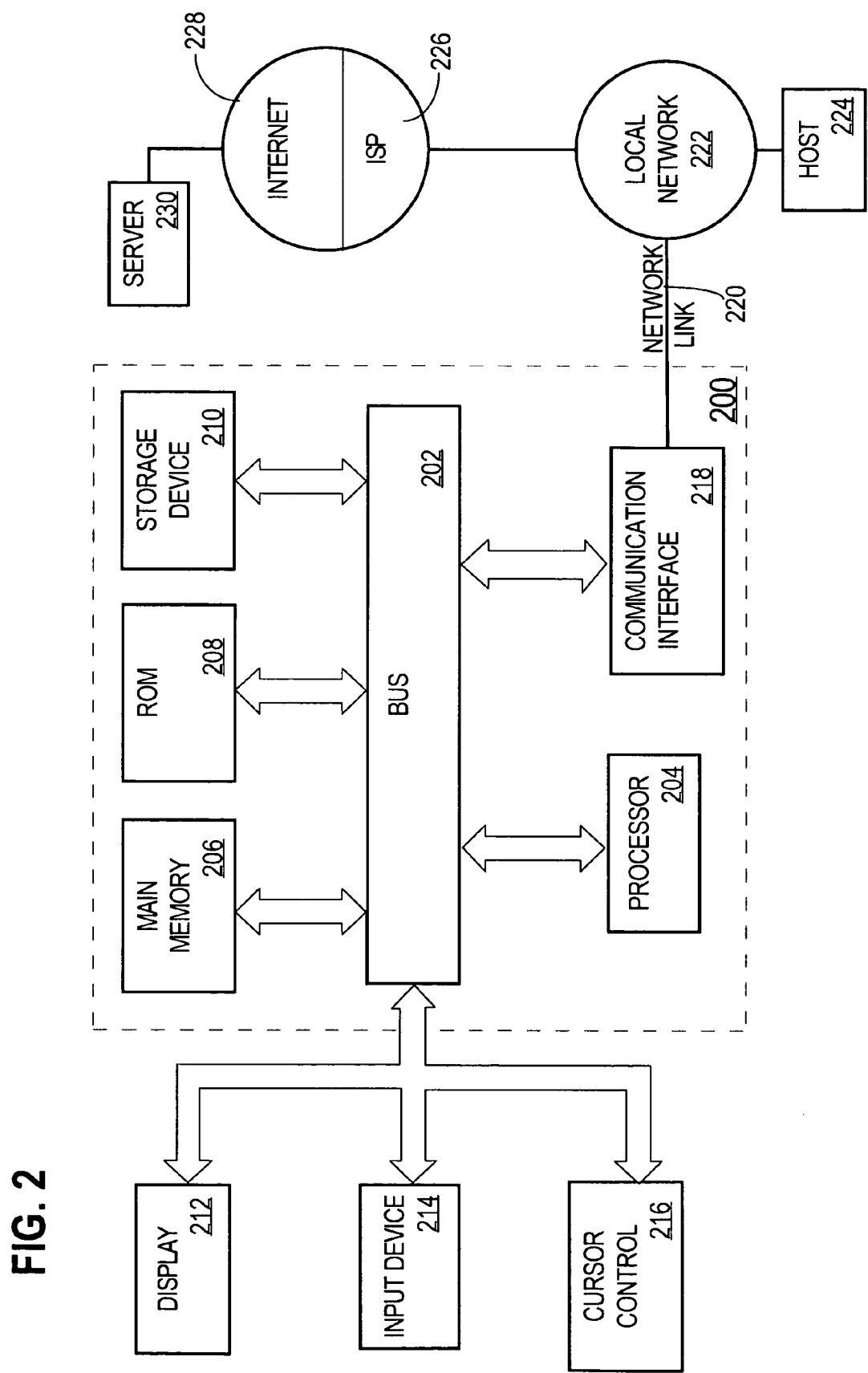
FIG. 2 is a block diagram of a system upon which the techniques described herein may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
based on one or more path expressions that identify nodes that have corresponding index entries in an index, a DBMS maintaining:
the index that contains index entries for each of a set of nodes that are defined by index metadata, wherein the index metadata includes the one or more path expressions that identify nodes that have corresponding index entries in the index;
the index also including index entries for ancestor nodes of each node in the set of nodes, wherein the union of the set of nodes and all ancestor nodes comprises less than all nodes within a collection of XML documents; and the DBMS receiving a query that includes a particular path expression;

based on the index metadata, the DBMS automatically determining at query compilation time whether the index may be used to evaluate the query;

wherein the DBMS automatically determining whether the index can be used comprises inspecting the index metadata to determine whether the nodes identified by the particular path expression are within the set of nodes indexed by the index;

in response to determining that the index may be used to evaluate the query, evaluating the query using the index; and sending query results;

wherein the method is performed by one or more computing devices.

2. The method of claim 1, wherein the collection of XML documents includes documents stored in a database in at least one of CLOB, object-relational structure, or BLOB.

3. A computer-readable volatile or non-volatile storage medium storing one or more sequences of instructions which, when executed by one or more processors, causes the one or more processors to perform:

based on one or more path expressions that identify nodes that have corresponding index entries in an index, a DBMS maintaining:

the index that contains index entries for each of a set of nodes that are defined by index metadata, wherein the index metadata includes the one or more path expressions that identify nodes that are indexed;

the index also including index entries for ancestor nodes of each node in the set of nodes, wherein the union of the set of nodes and all ancestor nodes comprises less than all nodes within a collection of XML documents; and the DBMS receiving a query that includes a particular path expression;

based on the index metadata, the DBMS automatically determining at query compilation time whether the index may be used to evaluate the query;

wherein the DBMS automatically determining whether the index can be used comprises inspecting the index metadata to determine whether the nodes identified by the particular path expression are within the set of nodes indexed by the index;

in response to determining that the index may be used to evaluate the query, evaluating the query using the index; and sending query results.

4. The computer-readable volatile or non-volatile storage medium of claim 3, wherein the collection of XML documents includes documents stored in a database in at least one of CLOB, object-relational structure, or BLOB.

5. A computer-implemented method comprising:
a DBMS maintaining:

an index that contains index entries for at least one node within a collection of XML documents, wherein the index includes entries for less than all nodes within the collection of XML documents;

wherein index metadata includes one or more path expressions that expressly identify a set of nodes within the collection of XML documents, wherein index entries corresponding to said set of nodes are excluded from the index;

the DBMS receiving a query that includes a particular path expression;

based on the index metadata, the DBMS automatically determining at query compilation time whether the index can be used to evaluate the query;

wherein the DBMS automatically determining whether the index can be used comprises inspecting the index metadata to determine whether nodes identified by the particular path expression are in said set of nodes for which corresponding index entries are excluded from the index;

in response to determining that the nodes identified by the particular path expression are in the set of nodes for which corresponding index entries are excluded from the index, evaluating the query without using the index; and sending query results;

wherein the method is performed by one or more computing devices.

6. A computer-readable volatile or non-volatile storage medium comprising instructions, which when executed, cause one or more processors to perform:

a DBMS maintaining:

an index that contains index entries for at least one node within a collection of XML documents, wherein the index includes entries for less than all nodes within the collection of XML documents;

wherein index metadata includes one or more path expressions that expressly identify a set of nodes within the collection of XML documents, wherein index entries corresponding to said set of nodes are excluded from the index;

the DBMS receiving a query that includes a particular path expression;

based on the index metadata, the DBMS automatically determining at query compilation time whether the index can be used to evaluate the query;

wherein the DBMS automatically determining whether the index can be used comprises inspecting the index metadata to determine whether nodes identified by the particular path expression are in said set of nodes for which corresponding index entries are excluded from the index;

in response to determining that the nodes identified by the particular path expression are in the set of nodes for which corresponding index entries are excluded from the index, evaluating the query without using the index; and sending query results.

* * * * *

UNITED STATES PATENT AND TRADEMARK OFFICE
CERTIFICATE OF CORRECTION

| | |
|---|---|
| PATENT NO. | : 7,885,980 B2 |
| APPLICATION NO. | : 11/401613 |
| DATED | : February 8, 2011 |
| INVENTOR(S) | : Tarachandani et al. |

It is certified that error appears in the above-identified patent and that said Letters Patent is hereby corrected as shown below:

On the title page, item [56]:

On page 4, in column 1, under "Other Publications", line 2, delete "Pulished" and insert -- Published --, therefor.

In column 1, line 54, delete "prefomance" and insert -- performance --, therefor.

Signed and Sealed this
Twentieth Day of September, 2011

David J. Kappos
*Director of the United States Patent and Trademark Office*